US012695811B2

(12) United States Patent
Lovell et al.

(10) Patent No.: US 12,695,811 B2
(45) Date of Patent: *Jul. 28, 2026

(54) SYSTEMS AND METHODS FOR EFFICIENTLY DISTRIBUTING ALERT MESSAGES

(71) Applicants: CCH AUSTRALIA LIMITED, North Ryde (AU); WOLTERS KLUWER UNITED STATES INC., Riverwoods, IL (US)

(72) Inventors: Jane E. Lovell, Sydney (AU); William S. Flannery, Plainsboro, NJ (US)

(73) Assignees: CCH AUSTRALIA LIMITED, North Ryde (AU); WOLTERS KLUWER UNITED STATES INC., Riverwoods, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/224,536

(22) Filed: Jul. 20, 2023

(65) Prior Publication Data

US 2023/0359960 A1 Nov. 9, 2023

Related U.S. Application Data

(63) Continuation of application No. 16/340,654, filed as application No. PCT/US2016/056269 on Oct. 10, 2016, now Pat. No. 11,727,330.

(51) Int. Cl.
*G06Q 30/02* (2023.01)
*G06F 16/36* (2019.01)
(Continued)

(52) U.S. Cl.
CPC .............. *H04L 67/55* (2022.05); *G06F 16/36* (2019.01); *G06F 40/205* (2020.01); *G06F 40/30* (2020.01);
(Continued)

(58) Field of Classification Search
None
See application file for complete search history.

(56) References Cited

U.S. PATENT DOCUMENTS 5,893,091 A * 4/1999 Hunt ................... G06F 16/9535
8,700,610 B1 * 4/2014 Kataru ............... G06F 16/2477
707/999.003
(Continued)

FOREIGN PATENT DOCUMENTS

CN 102437972 A 5/2012
CN 102812486 A 12/2012
(Continued)

OTHER PUBLICATIONS

PCT International Search Report and Written Opinion for Application No. PCT/US2016/056269, mailed May 8, 2017.
(Continued)

*Primary Examiner* — Mathew Syrowik
(74) *Attorney, Agent, or Firm* — Morgan, Lewis & Bockius LLP

(57) ABSTRACT

In response to receiving a text describing a news event, a centralized information provider applies semantic rules to the text to determine to which client attributes the text corresponds. The centralized information provider retrieves, from an electronic database, (i) identifiers for multiple clients, (ii) a set of client attributes for each of the clients, and (iii) for each of the clients, an identifier of a respective service provider. The centralized information provider then generates a metric of relevance of the news event for each of the clients, based on the client attributes of the client and the client attributes to which the text was determined to correspond. The centralized information provider transmits, to at least one service provider, an electronic alert message descriptive of the news event and an indication of a set of
(Continued)

100 clients of the service provider for distribution to some or all of the set of clients.

20 Claims, 11 Drawing Sheets

(51) Int. Cl.

| | |
|---|---|
| *G06F 40/205* | (2020.01) |
| *G06F 40/30* | (2020.01) |
| *G06Q 10/0631* | (2023.01) |
| *G06Q 10/107* | (2023.01) |
| *H04L 51/214* | (2022.01) |
| *H04L 67/55* | (2022.01) |

(52) U.S. Cl.
CPC ... *G06Q 10/063114* (2013.01); *G06Q 10/107* (2013.01); *H04L 51/214* (2022.05)

(56) References Cited

U.S. PATENT DOCUMENTS

| | | | | |
|---|---|---|---|---|
| 2003/0093789 | A1* | 5/2003 | Zimmerman | H04H 20/59 |
| | | | | 725/35 |
| 2005/0015472 | A1* | 1/2005 | Catania | G06F 9/542 |
| | | | | 705/37 |
| 2008/0301175 | A1* | 12/2008 | Applebaum | G06F 16/24565 |
| | | | | 707/999.102 |
| 2010/0299703 | A1* | 11/2010 | Altman | H04H 60/04 |
| | | | | 709/204 |
| 2011/0238608 | A1 | 9/2011 | Sathish | |
| 2013/0174058 | A1 | 7/2013 | Kaul et al. | |
| 2014/0032539 | A1* | 1/2014 | Potok | G06F 16/951 |
| | | | | 707/723 |
| 2014/0032664 | A1 | 1/2014 | Wookey | |
| 2014/0149315 | A1* | 5/2014 | Evenhouse | G06Q 40/06 |
| | | | | 709/217 |
| 2015/0074191 | A1* | 3/2015 | Feng | H04L 67/55 |
| | | | | 709/204 |
| 2016/0132773 | A1* | 5/2016 | Chandrasekaran | G06F 16/243 |
| | | | | 706/11 |
| 2016/0149851 | A1* | 5/2016 | Pan | H04W 4/21 |
| | | | | 709/206 |
| 2016/0342599 | A1* | 11/2016 | Koutrika | G06F 16/24575 |
| 2020/0050999 | A1* | 2/2020 | Lovell | G06Q 10/107 |

FOREIGN PATENT DOCUMENTS

| | | |
|---|---|---|
| CN | 103886090 A | 6/2014 |
| CN | 104386090 A | 3/2015 |
| CN | 104636373 A | 5/2015 |
| TW | 201040752 A | 11/2010 |

OTHER PUBLICATIONS

Preliminary Office Action for Application No. BR112019007168-7, dated Jul. 28, 2020.

Notification of Reason for Rejection for Japanese Application No. 2019-540508, dated Sep. 18, 2020.

Indian Patent Application No. 201947017741, Examination Report, dated Aug. 4, 2021.

Chinese Patent Application No. 201680091478.7, First Office Action, issued Jan. 5, 2023.

Brazilian Patent Application No. 112019007168-7, Office Action, issued Apr. 11, 2023.

Examiner Requisition issued in corresponding Canadian Application No. 3,039,327, dated Apr. 14, 2025, 5 pages.

* cited by examiner

*FIG. 1*

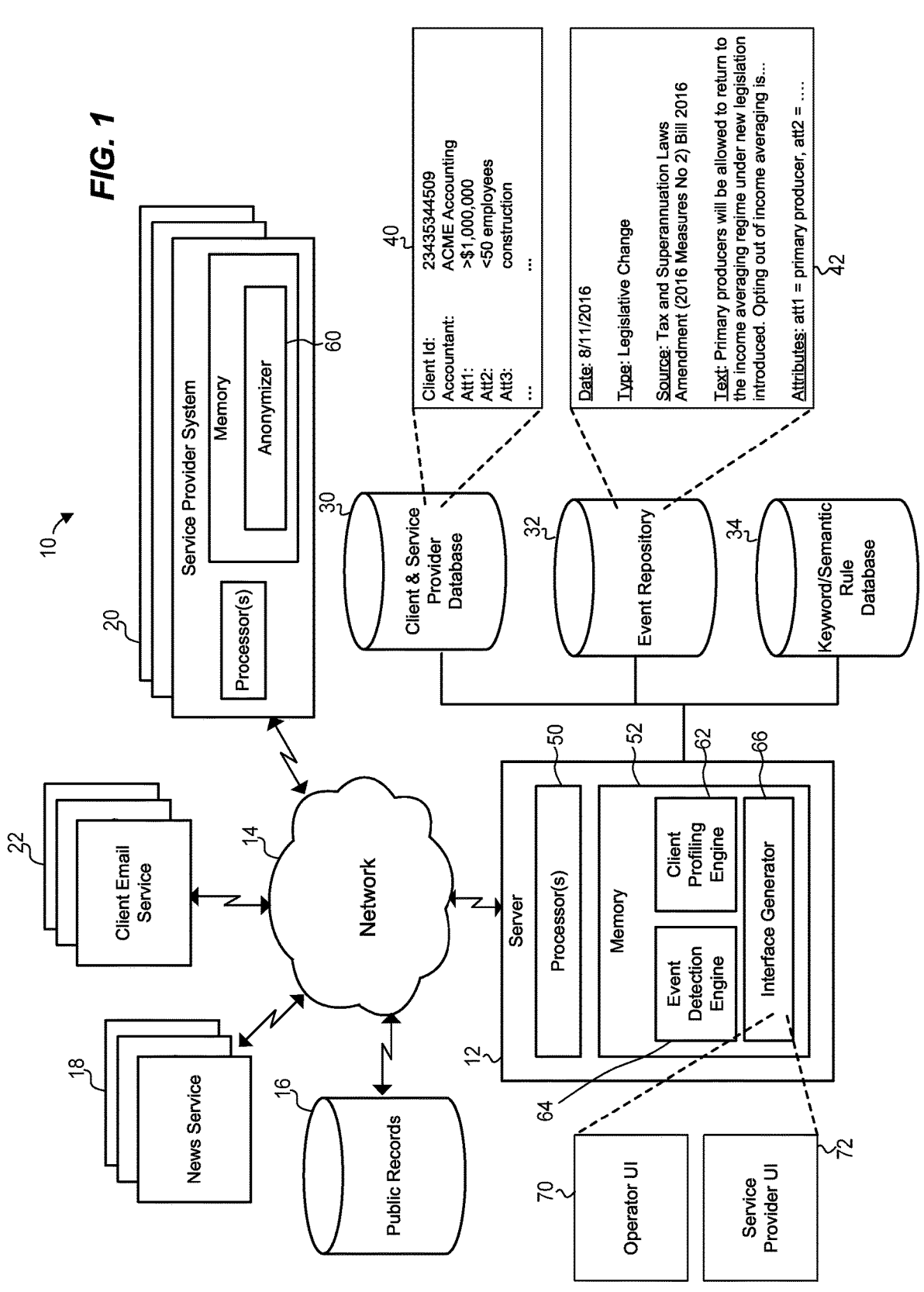

Client Id:
Accountant:  23435344509
Att1:  ACME Accounting
Att2:  >$1,000,000
Att3:  <50 employees
...  construction
...

40

Date: 8/11/2016

Type: Legislative Change

Source: Tax and Superannuation Laws Amendment (2016 Measures No 2) Bill 2016

Text: Primary producers will be allowed to return to the income averaging regime under new legislation introduced. Opting out of income averaging is....

Attributes: att1 = primary producer, att2 = ....

42

Service Provider System

Memory

Anonymizer  60

Processor(s)

20

10

30  Client & Service Provider Database

32  Event Repository

34  Keyword/Semantic Rule Database

14  Network

22  Client Email Service

18  News Service

16  Public Records

Server  12

Processor(s)  50

Memory  52

Client Profiling Engine  62

Event Detection Engine  64

Interface Generator  66

70  Operator UI

72  Service Provider UI

150

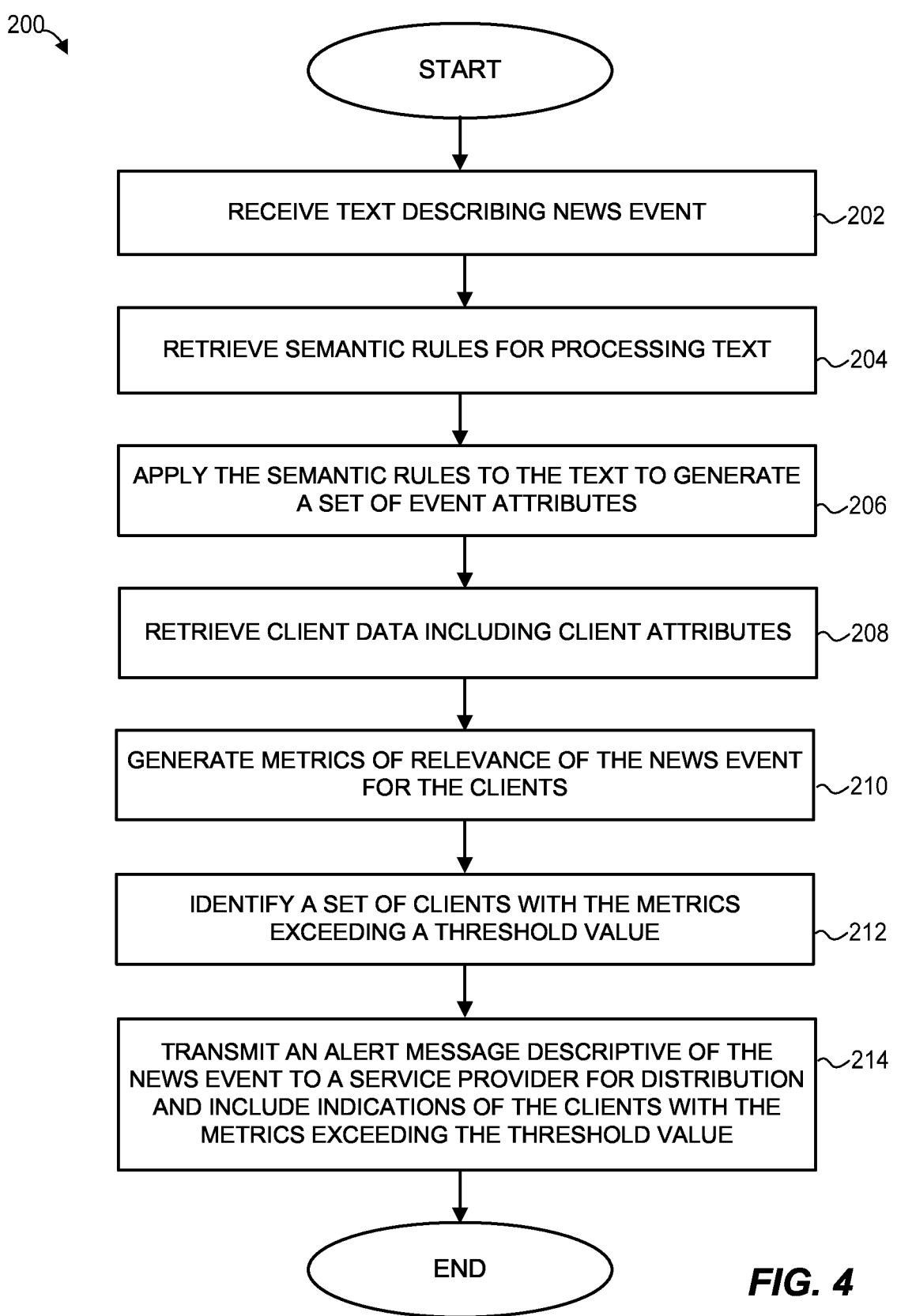

200

START

RECEIVE TEXT DESCRIBING NEWS EVENT — 202

RETRIEVE SEMANTIC RULES FOR PROCESSING TEXT — 204

APPLY THE SEMANTIC RULES TO THE TEXT TO GENERATE A SET OF EVENT ATTRIBUTES — 206

RETRIEVE CLIENT DATA INCLUDING CLIENT ATTRIBUTES — 208

GENERATE METRICS OF RELEVANCE OF THE NEWS EVENT FOR THE CLIENTS — 210

IDENTIFY A SET OF CLIENTS WITH THE METRICS EXCEEDING A THRESHOLD VALUE — 212

TRANSMIT AN ALERT MESSAGE DESCRIPTIVE OF THE NEWS EVENT TO A SERVICE PROVIDER FOR DISTRIBUTION AND INCLUDE INDICATIONS OF THE CLIENTS WITH THE METRICS EXCEEDING THE THRESHOLD VALUE — 214

END

*FIG. 4*

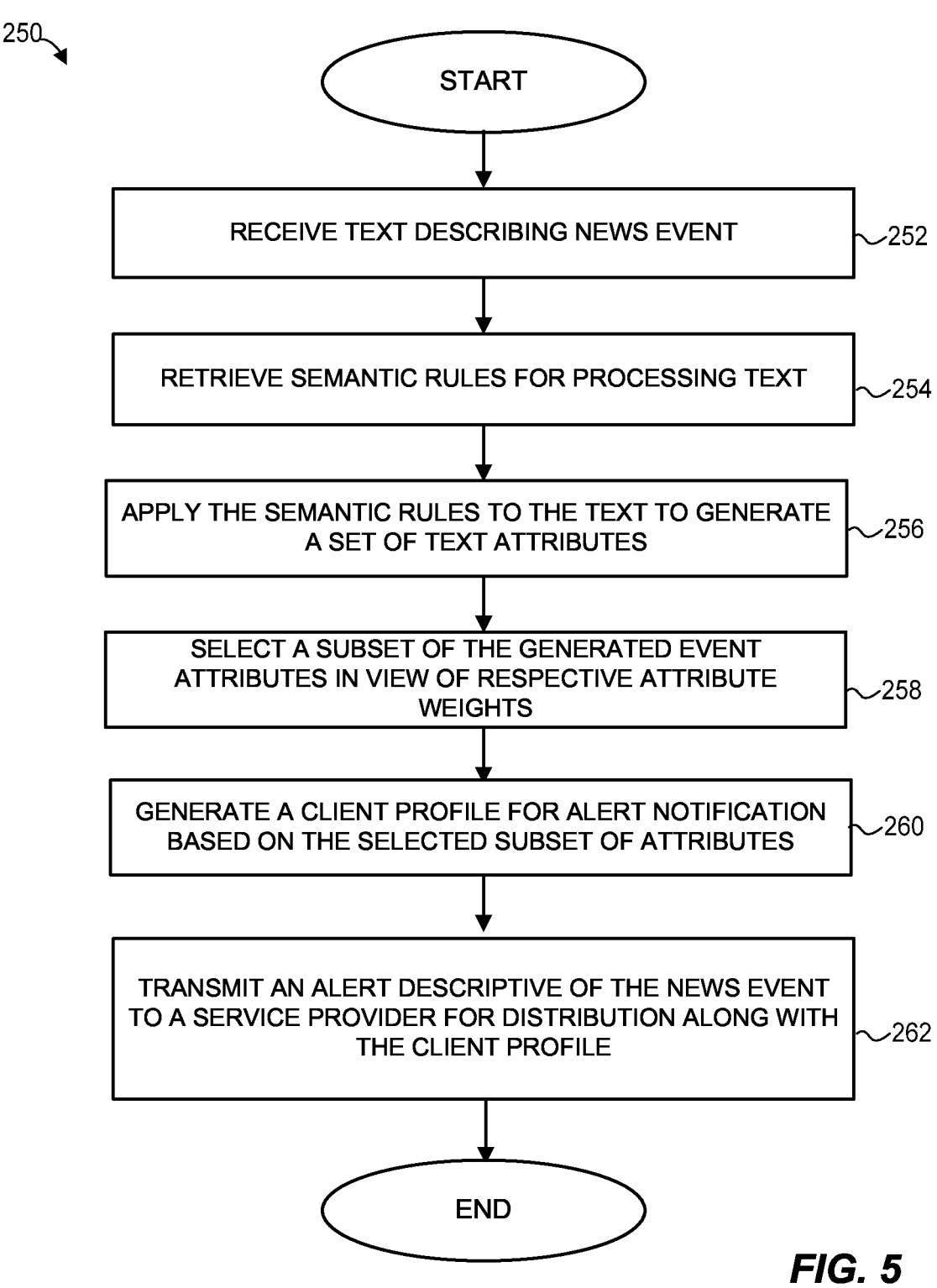

250

START

RECEIVE TEXT DESCRIBING NEWS EVENT ~252

RETRIEVE SEMANTIC RULES FOR PROCESSING TEXT ~254

APPLY THE SEMANTIC RULES TO THE TEXT TO GENERATE A SET OF TEXT ATTRIBUTES ~256

SELECT A SUBSET OF THE GENERATED EVENT ATTRIBUTES IN VIEW OF RESPECTIVE ATTRIBUTE WEIGHTS ~258

GENERATE A CLIENT PROFILE FOR ALERT NOTIFICATION BASED ON THE SELECTED SUBSET OF ATTRIBUTES ~260

TRANSMIT AN ALERT DESCRIPTIVE OF THE NEWS EVENT TO A SERVICE PROVIDER FOR DISTRIBUTION ALONG WITH THE CLIENT PROFILE ~262

END

EVENT DETAILS

| | |
|---:|:---|
| STATUS | RELEASED |
| TYPE | LEGISLATIVE CHANGE |
| TITLE | Changes to primary producer income averaging regime |
| CREATE DATE | March 15, 2016 6:45:45 PM |
| MODIFCATION DATE | April 19, 2016 2:24:07 AM |
| SOURCE | Comlaw |
| CONTRIBUTOR | John Smith |
| DESCRIPTION | The Government introduced legislation that would... |

Details     Related Events     Event Criteria

Source Document

Original     Enriched

Mentioned in Event

Primary Production business     delete

Partnership     delete

Family Trust     delete

Search entities to add     Add entity

Tax Concepts

Income averaging     delete

Partnership distribution     delete

Primary production losses     delete

Search tax concepts to add     Add tax concept

*FIG. 7*

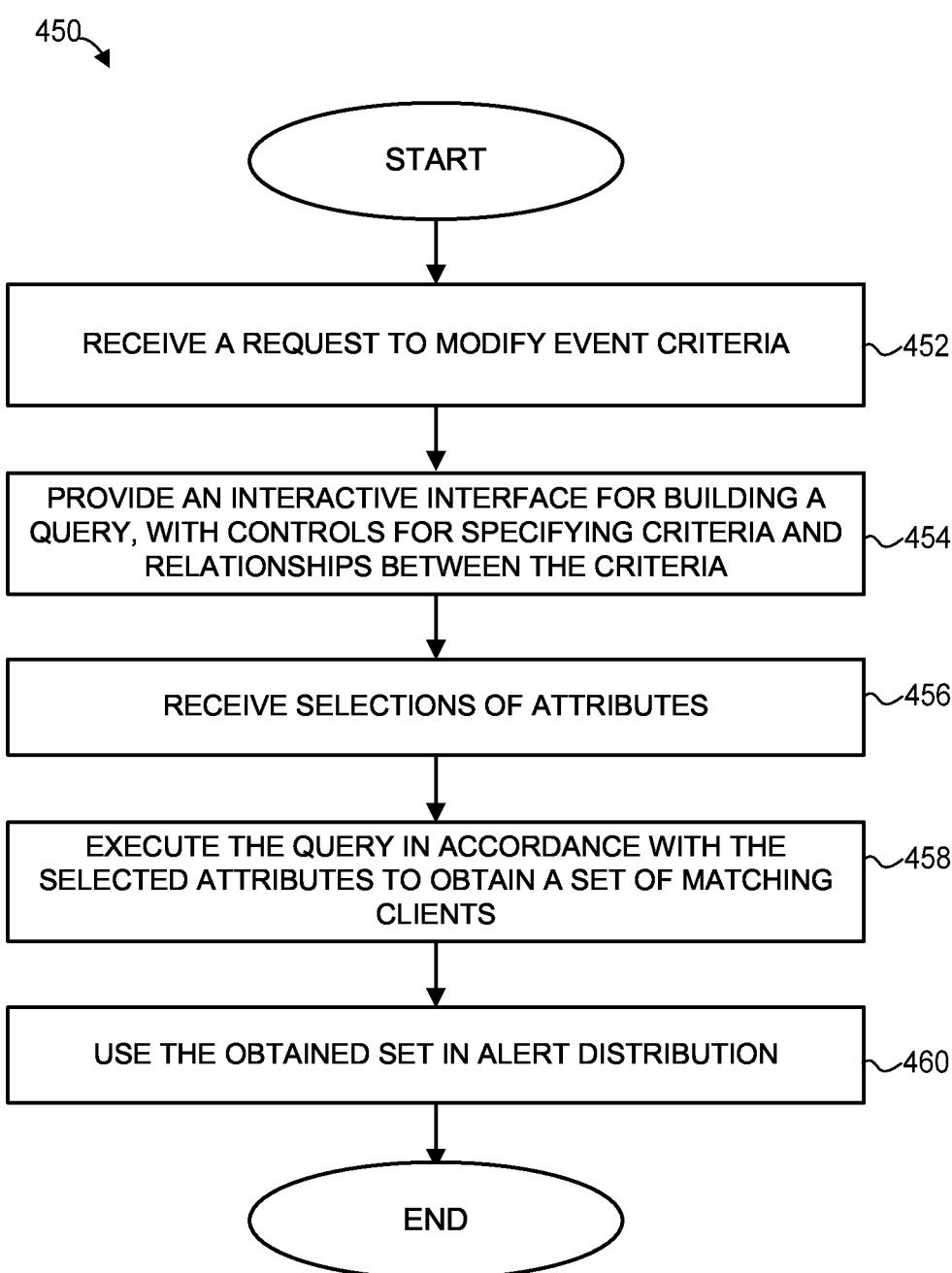

450

START

RECEIVE A REQUEST TO MODIFY EVENT CRITERIA          452

PROVIDE AN INTERACTIVE INTERFACE FOR BUILDING A QUERY, WITH CONTROLS FOR SPECIFYING CRITERIA AND RELATIONSHIPS BETWEEN THE CRITERIA          454

RECEIVE SELECTIONS OF ATTRIBUTES          456

EXECUTE THE QUERY IN ACCORDANCE WITH THE SELECTED ATTRIBUTES TO OBTAIN A SET OF MATCHING CLIENTS          458

USE THE OBTAINED SET IN ALERT DISTRIBUTION          460

END

START

PROVIDE SEMANTIC REPRESENTAION OF ANONYMIZED CLIENT DATA TO CENTRALIZED INFORMATION PROVIDER ～502

RECEIVE A NEWS ALERT WITH METADATA FOR DETERMINING POTENTIAL DISTRIBUTION OF THE NEWS ALERT ～504

PROVIDE A SERVICE PROVIDER USER INTERFACE ～506

RECEIVE DISTRIBUTION COMMANDS VIA THE SERVICE PROVIDER UI ～508

SEND THE NEWS ALERT TO CLIENTS ～510

END

550

EVENTS

| EVENT TITLE | CLIENTS MATCHED▼ | DATE ANNOUNCED | LAST UPDATED |
|---|---|---|---|
| New Stamp Duty Charge | 25 | 9/1/16 | 9/2/16 |
| This Cap Calculations | 14 | 8/30/16 | 9/2/16 |
| Farm management deposit | 2 | 7/29/16 | 8/28/16 |
| ... | | | ... |

| EVENT CRITERION | MATCHES |
|---|---|
| Companies with assessable income of $200,000 or less | 7 |
| Companies who claimed R&D offset | 1 |

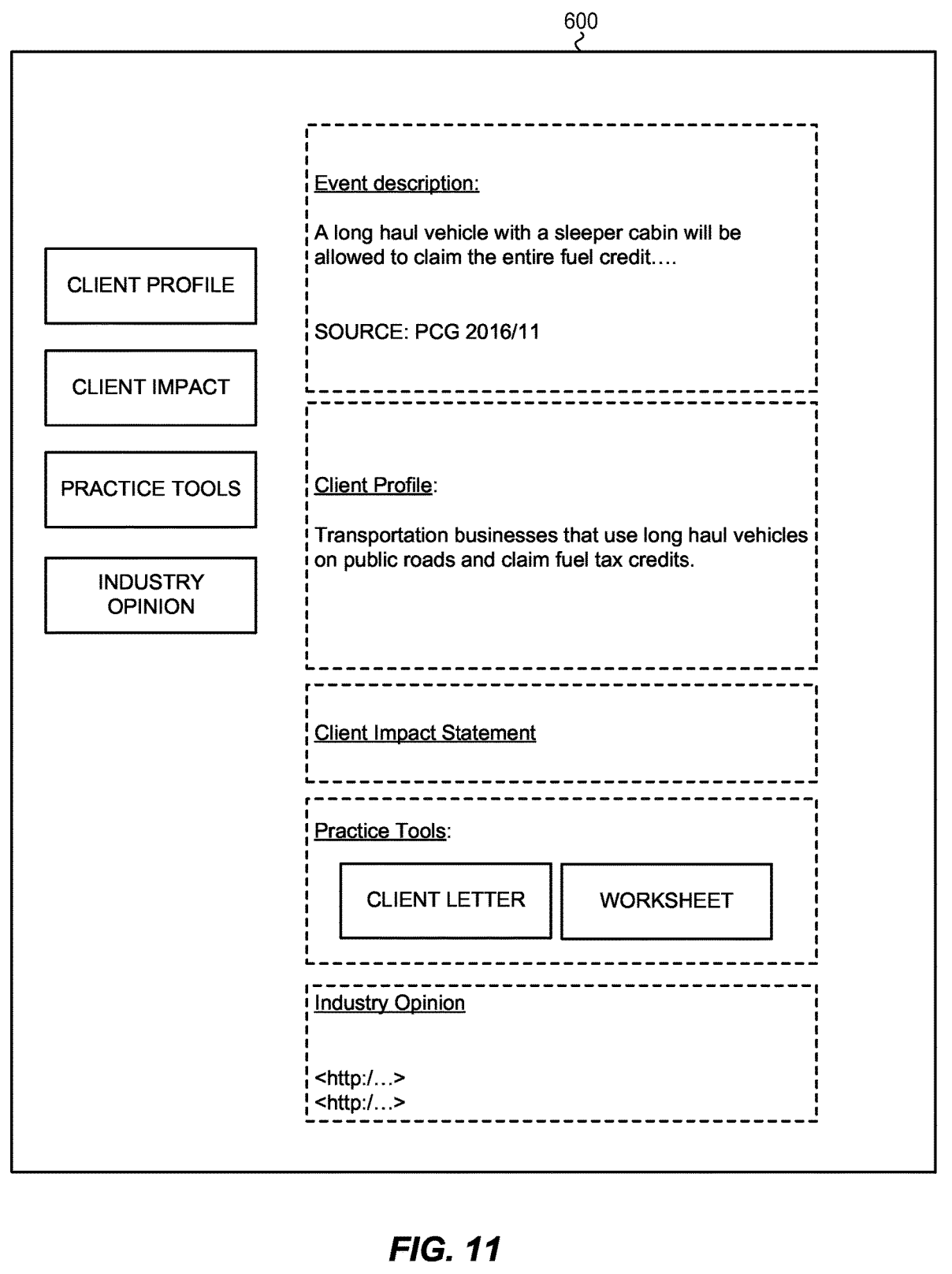

CLIENT PROFILE

CLIENT IMPACT

PRACTICE TOOLS

INDUSTRY OPINION

Event description:

A long haul vehicle with a sleeper cabin will be allowed to claim the entire fuel credit....

SOURCE: PCG 2016/11

Client Profile:

Transportation businesses that use long haul vehicles on public roads and claim fuel tax credits.

Client Impact Statement

Practice Tools:

CLIENT LETTER     WORKSHEET

Industry Opinion

<http:/...>
<http:/...>

FIG. 11

SYSTEMS AND METHODS FOR EFFICIENTLY DISTRIBUTING ALERT MESSAGES

CROSS-REFERENCE TO RELATED APPLICATIONS

The present application is a continuation of U.S. application Ser. No. 16/340,654, entitled "SYSTEMS AND METHODS FOR EFFICIENTLY DISTRIBUTING ALERT MESSAGES," and filed Apr. 9, 2019, which was a U.S. National Stage of International Application No. PCT/US2016/056269, entitled "SYSTEMS AND METHODS FOR EFFICIENTLY DISTRIBUTING ALERT MESSAGES," and filed Oct. 10, 2016.

FIELD OF THE DISCLOSURE

The following disclosure generally relates to systems and methods for generating and distributing alert messages related to news events and, more particularly, to automatically determining how alerts should be distributed to clients using semantic rule processing.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Providers of professional services such as accounting, medicine, law, etc. often notify their clients of relevant industry news, recent practice developments, and changes in technology or regulation. To this end, the providers generally peruse numerous documents from various sources. In some cases, the providers also subscribe to updates from publishers or news aggregators. These updates can relate to a specific topic or area of interest such as taxation, for example. Although subscribing to such updates is generally more efficient than reviewing primary sources, the updates still require that the providers of professional services process a large amount of information to identify specific clients or prospects who may be interested in these updates. Further, the providers and often tailor the presentation of these updates for individual recipients. Still further, to the extent that providers of professional services can deploy various searching or text processing tools, this processing in general is computationally inefficient due to the large number of nodes at which it occurs.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Generally speaking, a system of this disclosure efficiently distributes electronic alerts related to various events from a centralized information provider to clients via intermediate service providers. To this end, the centralized information provider according to one example implementation receives anonymized datasets specifying various attributes of clients of the service providers, receives "raw" information describing potentially relevant events from various sources, processes the information using semantic rules to automatically identify attributes of the information that correspond to the attributes of the clients, and generates metrics of relevance of the information to the clients. The centralized information provider then distributes electronic alerts descriptive of the received information along with the generated metrics of relevance, so that the service providers can further distribute the alerts to their respective clients in a consistent, reliable and efficient manner. The system of this disclosure thus eliminates the need to process information at multiple network nodes, thereby increasing the overall efficiency of distributing alerts and, more particularly, reducing the processing cost and memory usage at the computing systems of the service providers. Moreover, the centralized information provider can apply a more robust set of semantic rules than the individual service providers to increase the probability of accurately distributing relevant alerts to clients.

One example embodiment of these techniques is a method for facilitating efficient distribution of electronic alerts to clients via intermediate service providers. The method includes receiving, by one or more processors of a centralized information provider, a text describing a news event. The method further includes receiving, by the one or more processors, semantic rules for processing text, where each of the semantic rules, when satisfied, specifies a correspondence to one or more client attributes, and applying, by the one or more processors, the semantic rules to the text to determine to which client attributes the text corresponds. Still further, the method includes retrieving, by the one or more processors from an electronic database, (i) identifiers for multiple clients, (ii) a set of client attributes for each of the of clients, and (iii) for each of the clients, an identifier of a respective service provider; generating, by the one or more processors for each of the clients, a metric of relevance of the news event based on the client attributes of the client and the client attributes to which the text was determined to correspond; and transmitting, to at least one service provider by the one or more processors, an electronic alert message descriptive of the news event and an indication of a set of clients of the service provider whose metrics of relevance exceed a certain threshold, for distribution to some or all of the set of clients.

In various implementations, the method described above also includes one or more of the following acts or steps. Transmitting the client attributes to which the text was determined to correspond, along with the alert message and the indication of a set of clients, to the at least one service provider. Providing, to the at least one service provider, a provider user interface that includes at least one of a first control for transmitting a bulk email based on the alert message to some or all of the clients, and a second control for creating internal tasks related to the alert message for a set of clients and linking the set of clients to the alert message for subsequent tracking. Providing, to an operator of the centralized information provider via a workstation, an operator user interface including a control for modifying the semantic rules applied to the news event. Applying the semantic rules via natural language processing (NLP) includes identifying semantic concepts (e.g., "organization," "monetary value," or "date") and various names entities, or certain combinations of semantic concepts within a certain scope such as sentence or paragraph, to trigger appropriate actions. Applying a word search approach instead of NLP includes parsing the text to detect presence of one or more word patterns, wherein each word pattern includes one or more keywords in a specified relative arrangement. Generating, using the client attributes to which the text was determined to correspond, a profile of a potential client for distribution of the news event, and transmitting the profile of the potential client to the at least one service provider. Automatically populating the electronic database with information related to the clients using a set of electronic documents, including parsing the set of electronic documents using second semantic rules.

Another example embodiment of these techniques is a method for efficiently distributing electronic alerts. The method includes providing, from a computing system associated with a service provider to a centralized information provider via a communication network, anonymized data including respective client attributes for each of multiple clients, each of the attributes selected from a predefined set. The anonymized data according to some implementations is transformed to a semantic representation to allow the centralized information provider to generate alerts more efficiently. The method further includes receiving, from the centralized information provider, an alert for a news event, the alert including (i) a textual component describing the news event and (ii) an indication of clients, selected from among the multiple clients, for which the news event was determined to have a metric of relevance in excess of a certain threshold using the respective client attributes. The method also includes determining, at the computing system, identities of the clients indicated in the received alert; providing a listing of the identified clients via a user interface, including providing a control for selecting or unselecting individual clients for distribution of the alert, and distributing the alert via the communication network to one or more clients selected via the user interface.

Yet other example embodiments of the techniques of this disclosure are computing systems including processing hardware and a non-transitory computer-readable memory. The memory stores instructions that, when executed by the processing hardware, executes any of the methods discussed above.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The FIGURES described below depict various aspects of the system and methods disclosed therein. It should be understood that each FIGURE depicts an embodiment of a particular aspect of the disclosed system and methods, and that each of the FIGURES is intended to accord with a possible embodiment thereof. Further, wherever possible, the following description refers to the reference numerals included in the following FIGURES, in which features depicted in multiple FIGURES are designated with consistent reference numerals.

There are shown in the drawings arrangements which are presently discussed, it being understood, however, that the present embodiments are not limited to the precise arrangements and instrumentalities shown, wherein:

FIG. 1 is a block diagram of a system in which techniques for distributing client alerts can be implemented;

FIG. 4 is a flow diagram of an example method for processing events and determining to which clients the corresponding alert is likely to be sent, which can be implemented in the server system illustrated the system of FIG. 1;

FIG. 5 is a flow diagram of an example method for processing events and generating a profile of a hypothetical client that likely will be interested in the alert, which also can be implemented in the server system illustrated the system of FIG. 1;

FIG. 7 is a diagram of an example user interface screen for presenting event via an operator interface, which can be implemented in the service provider system illustrated the system of FIG. 1;

FIG. 8 is a flow diagram of an example method for modifying or building an event query using input received via an operator interface, which can be implemented in the server system illustrated the system of FIG. 1;

FIG. 10 is an example widget for reviewing received alerts, which can displayed as part of a service provider interface in the system of FIG. 1;

FIG. 11 illustrates an example user interface screen for reviewing event data, which can displayed as part of a service provider interface in the system of FIG. 1; and FIG. 12 is an example widget for reviewing event criteria, which can displayed as part of a service provider interface in the system of FIG. 1.

DETAILED DESCRIPTION

Overview

Figure 2:
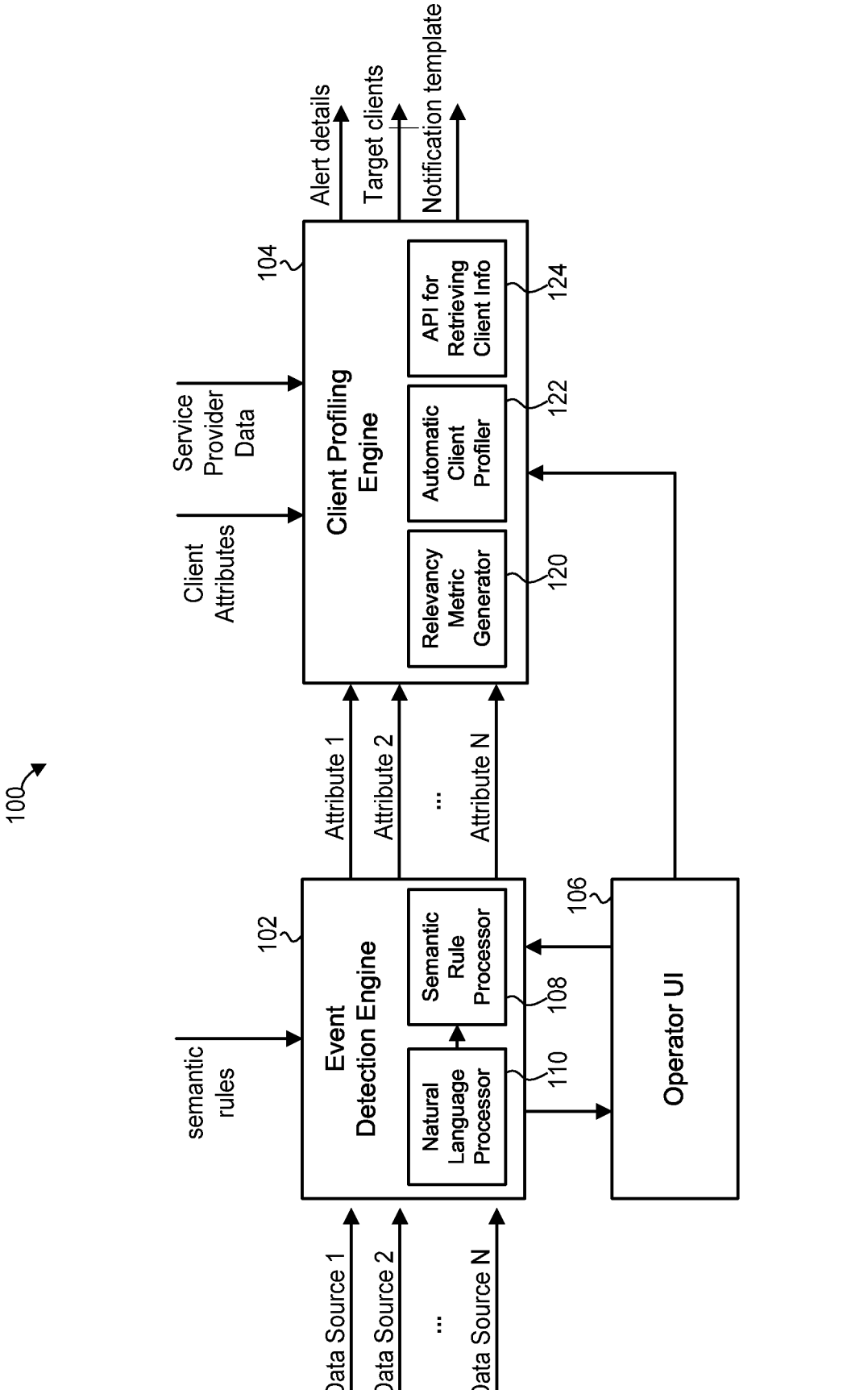
FIG. 2 is a block diagram of example event detection and client profiling engines, which can be implemented in the system of FIG. 1.

The techniques discussed below can be implemented in an environment in which a centralized information provider such as a publishing company, for example, transmits news alerts to providers of services such as accounting, medical care, legal counseling, etc., which in turn distribute information to their clients that can include individuals, corporations, and other organizations. These techniques reduce the computational complexity associated with identifying relevant information and routing the relevant information via communication networks, improve the overall accuracy of delivering relevant alerts, provide user interfaces that improve efficiency by supporting simultaneous operations upon multiple clients, for example, and provide other technical advantages.

As discussed below, a server system of the centralized information provider can distribute news alerts along with metadata that specifies, in a probabilistic manner, how the alerts should be further distributed. In other words, the server system specifies anonymous clients and/or profiles of clients that are likely to be interested in the particular alert. The server system can receive information from various sources such as news outlets, press releases, publications by regulatory bodies, etc., and apply semantic rules to the received information to identify various attributes of clients that may be interested in the received information (e.g., "corporation incorporated between Jan. 1, 2016 and Dec. 31, 2016," "company with annual income of $200,000 or less," "construction company"). In some scenarios, the server system then uses anonymized data from service providers describing various client attributes to identify clients for potential notification. In other scenarios, the server system automatically generates a profile of a client that probably should be notified, and distributes the profile to various service providers along with an alert based on the received information, for subsequent distribution to relevant clients.

The server system can provide an interactive user interface ("operator UI") via which operators of the centralized information provider can review automatically detected events, add or delete attributes of the event, refine automatically created queries or even build new search queries in some cases by specifying various criteria by which clients should be selected for notification, etc. The operators also can use the operator UI to link additional information to the events, create and edit suggested client letters, and generate other event content. More generally, the operators can use the operator UI to modify the content, the timing, and the targets of event notification.

Further, the server system can provide a different interactive user interface to service providers ("service provider UI"). Using the service provider UI, a service provider can review the news alerts received from the centralized information provider, review the identified matches between the service provider's clients and the news alert, adjust the automatically identified matches to add or delete clients, and begin automatic notification of the clients. The service provider UI can support bulk distribution of alerts to multiple clients, thereby improving efficiency of the corresponding service provider system. In some implementations, a news alert includes suggested text for client notification, and the user interface exposed to the service providers includes controls for reviewing and modifying the suggested text.

An example computing environment in which these techniques can be implemented in discussed with reference to FIG. 1, and example processing engines operating in this computing environment are discussed with reference to FIG. 2, followed by a discussion of data flow in the computing environment. Examples methods, operator interfaces that can be provided at the centralized information provider, and service provider interfaces that can be provided as service provider systems are then discussed with reference to the remaining figures.

Example Computing Environment

Referring to FIG. 1, an example computing environment 10 includes a server system 12 associated with an information provider such as a publishing company. The server system 12 can include one or more servers coupled to a communication network 14, via which the server system 12 can access various sources of information such as public records 16 and news sources 18. The sources 16 and 18 can include web sites, mail servers, newsgroups, etc. maintained by government regulatory bodies that post announcements regarding new regulations, industry-specific associations, news outlets, courts, etc. Depending on the implementation, the server system 12 can poll the sources 16 and 18 for new information according to a certain schedule, such as every hour, or the server system 12 can subscribe to real-time notifications from the sources 16 and 18.

The computing environment 10 further includes service provider systems 20. Each of the systems 20 can include one or more servers including processor(s) and non-transitory computer-readable memory or, in some implementations, an account associated with a cloud-based service, for example.

The systems 20 can be operated by providers of professional services such as accounting, medical care, etc. The service provider systems 20 can communicate with client email services 22 via the communication network 14, where the client email services 22 are operated by various clients or subscribers of the service providers.

The server system 12 can be coupled to electronic databases such a client and service provider database 30 storing information related for various services providers and anonymized client data, for example. An event repository 32 can store event data which the server system 12 generates based on the "raw" information received from the sources 16 and 18. A semantic rules database 34 stores definitions of various rules which the sever system 12 applies to the raw information and to the anonymized client data to determine relevance of the information to various clients. Each of the databases 30, 32 and 34 can be implemented as a separate database or as part of a single database, which can be implemented using any suitable techniques (e.g., using a set of tables interconnected by indices to define a relational database).

An example data record 40 stored in the service provider database 30 describes attributes of a certain client. The data record 40 includes an anonymized client identifier along with an identifier of the service provider with which the client is associated. Although the anonymized client identifier does not reveal identity of the client to the server system 12, the service provider referenced in the data record 40 can use the anonymized client identifier to identify the client. The data record 40 also includes such example attributes as annual income level of the client, a flag indicating whether the client has more than 50 employees, a field identifying the type of business in which the client is engaged.

An example data record 42 stored in the database 32 describes an event processed by the server system 12. The data record 42 includes fields to indicate the date associated with the event (e.g., the date when a certain legislative change will come into effect and/or the date when information about upcoming change was received), the type of event, the source of information related to the event, the text to be distributed to service providers in connection with the event, attributes of the event which the server system 12 determines based on the source information, etc.

With continued reference to FIG. 1, the server system 12 includes one or more processors 50 and a non-transitory memory 52 readable by the one or more processors 50. The memory 52 can store instructions that implement a client profiling engine 62, an event detection engine 64, and an interface generator 66. Each of the service provider systems 20 also can include one or more processors and a non-transitory memory storing instructions that implement an anonymizer 60. The non-transitory memory of the service provider systems 20 also can store web browsers or other applications that allow service providers to access various functions of the server system 12. The service provider systems 20 can obtain the instructions that implement the anonymizer 60 by invoking an appropriate application programming interface (API) function exposed by the server system 12, for example.

In operation, the service provider systems 20 invoke the anonymizer 60 to remove actual client identifiers from client data, replace the client identifiers with temporary identifiers such as alphanumeric strings that appear random, generate a semantic representation of the anonymized data, and provide the semantic representation of the anonymized data to the server system 12. The server system 12 receives new information from the sources 16 and 18 and identifies a new event. The engines 62 and 64 determine to which anonymized clients the new event corresponds, and the server system 12 generates alert messages for some or all of the server provider systems 20 related to the event. The interface generator 66 provides an operator UI 70 via which an operator of the server system 12 can adjust event criteria to select or unselect various event attributes, formulate and initiate queries, etc. The interface generator 66 also can provides a web-based API using which the service provider systems 20 can interact with the server system 12. When invoked, the API can generate service provider UI screens 72. In this manner, service providers can review the received alerts and automatically distribute the alerts to clients, for example.

Example Components for Processing Events and Client Data

Now referring to FIG. 2, an example processing environment 100 can be implemented in the server system 12, for example. In general, the components of the processing environment 100 can be implemented in a single server or multiple servers, possibly disposed remotely from each other.

The processing environment 100 includes an event detection engine 102 in communication with a client profiling engine 104. The event detection engine 102 includes a semantic rule processor 108 and a natural language processor 110. The event detection engine 102 can receive input from, and provide output to, an operator UI 106 (which may be similar to the operator UI 70 discussed with reference to FIG. 1. The event detection engine 102 receive data from various data sources 1, 2, . . . N. Referring back to FIG. 1, the data sources 1, 2, . . . N can include the public records 16 and the news sources 18. These data sources can include text and, in some implementations, other media such as images, audio, video, etc. In some cases, multiple data sources 1, 2, . . . N can provide information which the event detection engine 102 consolidates as a single event (for example, multiple news outlets can report regarding the same development).

The event detection engine 102 also receives semantic rules and domain-specific concepts (e.g., fiscal year in the tax document domain, weigh in the medical record domain), which the semantic rule processor 108 uses to determine whether the text received from the data sources includes certain attributes that trigger event notification. More generally, the natural language processor 110 can provide semantic data to the semantic rule processor 108, which then can execute rules to determine whether the idea expressed by the semantic data and the refining characteristics represent an impactful change that should trigger an alert. As part of its output, the natural language processor 110 can specify dates, amounts of money, locations, etc. The semantic rules can be stored in a database such as the database 34 illustrated in FIG. 1. The semantic rules can be formatted in any suitable manner to specify, for example, that a certain semantic domain concept occurring in the document should cause the event detection engine 102 to assign a certain attribute (e.g., "agricultural regulation") and refining characteristics to the corresponding event. Thus, a semantic rule can specify that certain semantic data or particular combinations or arrangements of semantic data in a text make it highly probable the text is relevant to companies with income of over $500,000 per year, even if the text does not contain the number $500,000.

As a more specific example, a federal agency responsible for regulating agricultural production can publish a bulletin on a website specifically designated for this purpose, and the event detection engine 102 can assign certain attributes to the event based on the source of the information. In accordance with additional semantic rules, the event detection engine 102 can assign more specific attributes to the event, such as the type of agricultural activity, whether the new development concerns imports or exports, whether the new development concerns farmers, suppliers, distributors, etc. Further, depending on the implementation or scenario, the semantic rules can specify whether the event detection engine 102 should specifically identify changes to the existing regulation or practices, identify only significant changes to the existing regulations or practices, or trigger on any notifications regarding these regulation or practices.

Using the operator UI 106, an operator can add, delete or modify the semantic rules, and control application of particular semantic rules to various data sources. The operator in some cases can use the operator UI 106 to override the automatic determination of attributes, remote attributes, or manually remove attributes. Further, the operator UI 106 can allow operators to modify or build queries using attributes.

In general, using NLP with semantic rules allows the event detection engine 102 to automatically detect ideas expressed in various forms, where the text does not adhere to rigid rules that require specific keywords. For example, the natural language processor 110 can recognize the concept "childcare worker," and equivalent expressions, where the corresponding regulated code used in standard documents is childcare_worker. Moreover, the natural language processor 110 can identify the concept of "childcare worker" along with names of jurisdictions (e.g., state of New York), dates, and other concepts such as "training" and "compliance," for example. The arrangement of these semantic concepts can correspond to a certain identifier of a rule that specifies how the resulting expression should be evaluated.

The event detection engine 102 generates a list of attributes for an event and provides these attributes to the client profile engine 104. As illustrated in FIG. 2, the client profile engine 104 can include a relevancy metric generator 120, an automatic client profiler 122, and an API 124 for retrieving information for matched clients. The client profile engine 104 in other implementations can include additional components or, conversely, omit some of the components illustrated in FIG. 2. The client profile engine 104 receives client attributes, service provider data as inputs, and commands from the operator UI 106 as inputs. The outputs of the client profile engine 104 can include alert details, indicators of target clients, and a notification template for notifying clients.

The automatic client profiler 122 can operate on forms, documents, and other domain-specific artifacts that are transformed to a domain-specific semantic model. Each artifact can be defined as a profile composed of items linked to client attributes. For example, the automatic client profiler 122 processes income tax returns to determine numerous attributes of a client. The income tax returns can conform to a standard electronic format in which data records are populated according to certain documented rules. Similarly, multiple well-documented formats such as HL7 exist today for medical records, and the automatic client profiler 122 can generate a client profile based on anonymized datasets received from hospitals. The system 100 also can create semantic models and transform the text accordingly for Health Insurance Portability and Accountability Act (HIPAA) policy documents, compliance checklists, etc. Similar to the event detection 102, the automatic client profiler 122 can apply semantic rules and/or natural language processing to extract client attributes. Once extracted, the client attributes can be stored in the database 30 illustrated in FIG. 1, for example. The automatic client profiler 122 can operate in a batch mode to process client data according to a certain schedule and store client attributes for subsequent use, for example, or the automatic client profiler 122 can operate substantially in real time to extract client attributes when a news event becomes available.

The relevancy metric generator 120 can receive event attributes from the event detection engine 102 and compare the event attributes to client attributes generated by the automatic client profiler 122. For example, if one of the attributes of an event is "income under $100,000 per year," and if the profile of a certain client also includes this attribute, the relevancy metric generator 120 can increase the counter of matching attributes. In some implementations, the relevancy metric generator 120 assigns weights to the attributes. The relevancy metric generator 120 can assign the weights in accordance with the specificity of the attribute, for example. Thus, an attribute which many clients share (e.g., state of incorporation="Delaware") may have a lower weight than an attribute that relatively few clients share (e.g., business type="dance studio").

Some of the semantic rules the event detection engine 102 and/or the client profiling engine 104 applies can correspond to event criteria defined by operators and/or stored in a database. For example, a certain event criterion can be that the new information concerns companies with the primary production losses claimed in the last income year being over $50,000. The corresponding rule specifies which semantic concepts, and in what relative arrangement, satisfy this criterion. Further, an event criterion can be parameterized by a number to allow approximate matches and hear-hits. To continue with the example above, $50,000 can be a parameter of the criterion "a company with the primary production losses claimed in the last income year being over X." Applying the corresponding semantic rule, the event detection engine 102 can detect a reference to primary production losses claimed in the last income year being over $40,000. The event detection engine 102 then can determine how close the value $40,000 is to the parameter $50,000, and generate an indication of an approximate match. Alternatively, the event detection engine 102 can detect a match between the event attribute and the client attribute, but assign a weight to the match in proportion to the amount of error defined by the difference between $40,000 and $50,000.

Based on the overlap between event attributes and client attributes, the relevancy metric generator 120 can determine whether the event is likely to be of interest to the client. In some implementations, the relevancy metric generator 120 can compare the number of matched attributes to the overall number of client attributes and/or the overall number of event attributes. For example, in order for the relevancy metric generator 120 to determine that the event is likely to be of interest to the client, the ratio of matched attributes N to the overall number of attributes available to the client M must exceed a certain threshold number T, according to one embodiment. In some embodiments, the threshold number T is set individually for each event.

With continued reference to FIG. 2, service providers can invoke the API 124 to identify clients to generate email notifications for individual or multiple clients, in accordance with commands received from the operator UI 106. For example, an operator can edit the text of an alert, and the API 124 additionally can generate a notification template that includes the text and the attributes of clients to which the text can be distributed.

Example Data Flow in a System for Distributing Alert Messages

Figure 3:
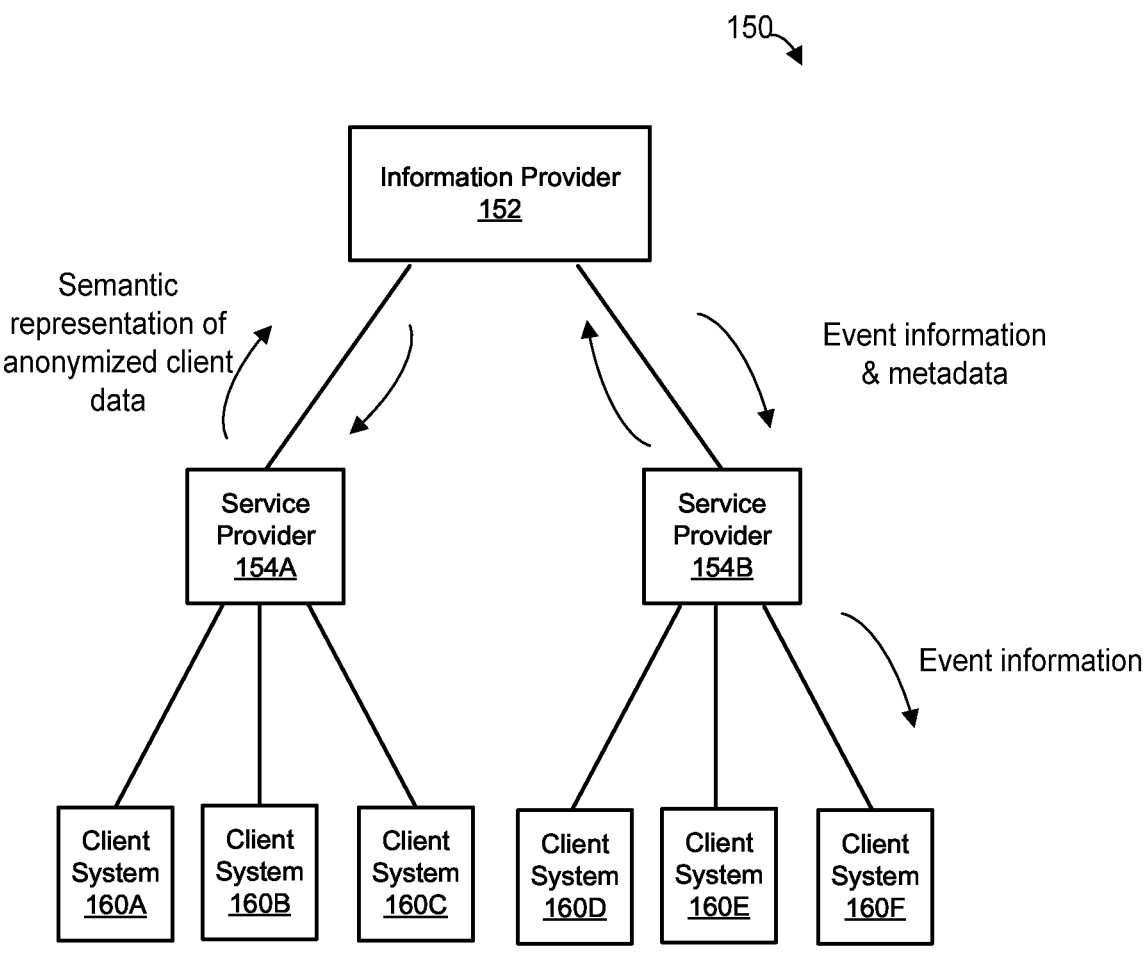
FIG. 3 is a conceptual diagram of example flow of information between different nodes operating in the system of FIG. 1.

For further clarity, FIG. 3 schematically illustrates the flow of data in the environment 10 or a similar computing environment. A topology 150 includes an information provider 152 communicates with services providers 154A, 154B, etc., each of which in turn communicate with respective client systems 160A-C, 160D-160F, etc. These entities can be similar to those that operate the service system 12, the service provider systems 20, and client email services 22, respectively (see FIG. 1).

As illustrated in FIG. 1, semantic representation of anonymized client data travels "upstream" in the topology 150 from service providers 154A and 154B, for example. An alert message including event information and metadata specifying anonymous clients, client profiles, matched attributes, etc. travels "downstream" from the information provider 152 to the service providers 154A and 154B, and event information travels to some of the client systems 160A-F.

It is noted that this arrangement advantageously allows semantic processing of events to occur at a single node, the information provider 152, thereby reducing computational load at the other nodes. In other words, this arrangement eliminates the need to perform similar operations, often applied to the same data, at the service providers 154A and 154B to determine event attributes.

Moreover, the arrangement of FIG. 3 defines a probabilistic routing scheme in which an alert message is transmitted to an intermediate node (e.g., from service provider 154A 154A) along with a list of probable recipients of the alert message, or endpoints. The intermediate node 154A thus receives information regarding recommended subsequent routing of the alert message, but the intermediate node 154A does not always forward the alert message to every endpoint identified by the information provider 152. Still further, although the information provider 152 can identify the attributes of the ultimate recipient of the alert message, the information provider 152 (at least in some embodiments) is not aware of the identities of these ultimate recipients.

Example Operator Methods and User Interfaces

Now referring to FIG. 4, an example method 200 for processing events and determining to which clients the corresponding alert is likely to be sent can be implemented in the server system 12 of FIG. 1, for example, or another suitable system. The method 200 can be implemented as a set of instructions stored on a non-transitory computer-readable medium and executable by one or more processors, for example.

The method 200 begins at block 202, where text describing a potential news event is received. As discussed above, the text can be received from any suitable source (e.g., the source 16 or 18 of FIG. 1) and, in some cases, multiple texts can be received from different sources for the same event.

At blocks 204 and 206, the semantic rules for processing text are obtained and applied to the text, respectively. Each semantic rule can require that one or more semantic concepts be present in the text in a particular relative arrangement, and specify an attribute to be assigned to the event if the semantic rule is satisfied. The semantic rules can be defined for a particular domain or industry, such as "construction" or "hospitality services," so that the same semantic concept match generates different attributes for different industries. If desired, the system in which the method 200 is implemented can use both semantic rules and natural language processing to extract event attributes.

At block 208, client data specifying client attributes is retrieved. In some embodiments, the client data is anonymized. A module such as the automatic client profiler 122 of FIG. 2 can process client dataset in an offline (batch) mode at an earlier time and populate a database (e.g., the database 30 illustrated in FIG. 1). More generally, block 208 in various embodiments can be executed prior to blocks 202 and 204, after blocks 202 and 204, or in parallel with blocks 202 and 204.

Once both the client attributes and the event attributes are available, metrics of relevance of the news event are generated for various clients at block 210. At discussed above, each metric can reflect the number of client attributes that match event attributes, and some of the attributed can be assigned higher weights.

At block 212, a set of clients with metrics exceeding a certain threshold value are identified. The threshold value can be defined in absolute terms (e.g., "5 or more matching attributes"), relative terms (e.g., "60% or more of the event attributes match client's attributes), or in any other suitable manner.

At block 214, an alert message that includes a description of the news event as well as indications regarding the proposed distribution of the alert message is transmitted to one or more service providers. The description of the news event in some cases can be automatically generated based on the text received at block 202. In other cases, an operator can manually edit the description via operator UI (e.g., operator UI 106 discussed with reference to FIG. 2). The indications regarding the proposed distribution of the alert message can include anonymized references to clients, which the corresponding service providers can use to determine client identity.

In some cases, however, specific clients cannot be identified for alert distribution due to unavailability of client data, for example, or because none of the clients in the available dataset have the sufficient number of client attributes matching the event attributes for a certain news event. Referring to FIG. 5, a method 250 is generally similar to the method 200, except that a client profile rather than identifiers of clients is transmitted to one or more service providers.

In particular, blocks 252-256 are similar to blocks 202-206 discussed above. At block 258, a subset of the identified event attributes is selected in view of respective attribute weights, and a client profile is generated based on the selected event attributes at block 260. The attribute weights are the same for all attributes according to one implementation of the method 250. In some embodiments, the client profile includes all of the identified event attributes.

At block 262, an alert message with a description of the event along with the generated client profile is transmitted to one or more service providers. The service providers then can use the received client to automatically identify clients for alert distributions using a dataset that was not exposed to the centralized information provider, for example.

Figure 6:
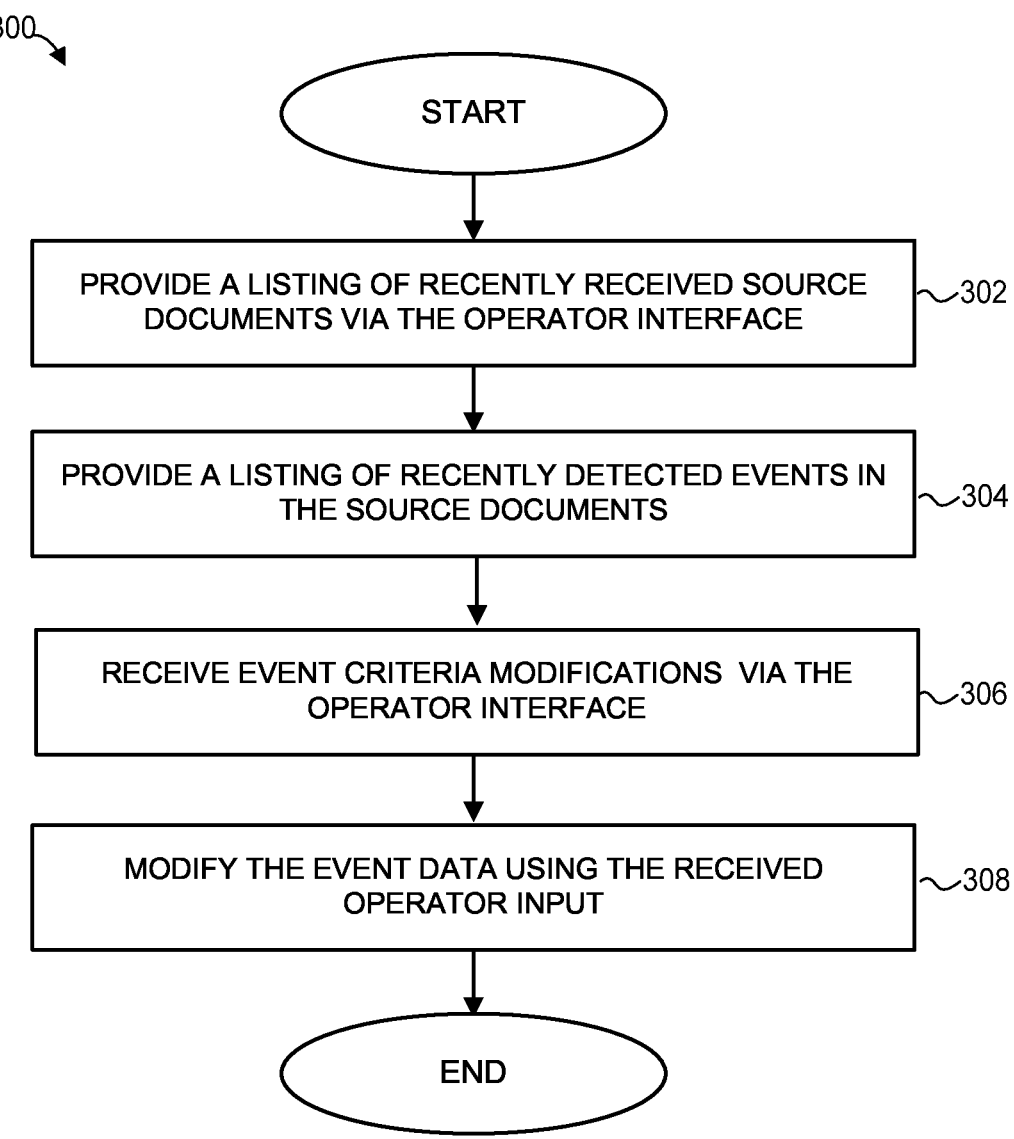
FIG. 6 is a flow diagram of an example method for receiving operator input and modifying event data in view of the received operator input, which can be implemented in the server system illustrated the system of FIG. 1.

Next, FIG. 6 depicts a flow diagram of an example method 300 or receiving operator input and modifying event data in view of the received operator input, which the server system 12 of FIG. 1 can implement using software instructions, for example. Referring back to FIG. 2, operator input and output can be received via the operator UI 106.

At blocks 302 and 304, listings of recently detected source documents and recently detected events are provided via the operator interface. It is noted that not every source document necessarily includes semantic concepts which the event detection engine 102, for example (see FIG. 2) can identify as matching one or more semantic rules or recognize using natural language processing. Accordingly, in one implementation, the operator UI lists both the source documents that were automatically recognized as a basis for a news event and source documents that were not used in generating the news event. The operator can review the documents of both types and, if desired, override the results of the automatic processing.

The operator can modify the event criteria at block 306. For example, the operator can add, remove, or edit the event criteria so as to modify the attributes assigned to the event. In response, the system can modify the event data in accordance with the operator input at block 308.

FIG. 7 illustrates an example user interface screen 400, which the operator UI 70 or 106 (see FIGS. 1 and 2) can provide to an operator of the centralized information provider to review a particular event. In an example scenario, the operator UI presents a searchable list of current and past events to the operator, and generates the screen 400 in response to the operator selecting one of these events.

The screen 400 can indicate the status of the event (e.g., Released, Pending, Deleted) at the centralized information provider. In this example scenario, the event has already been released to service providers. The screen 400 also indicates the type of event (in this case, Legislative Change), the title of the event, create and last modification dates, the source(s) of the event, the name of the contributor, and a brief description. More generally, the screen 400 can display any desired number of informational fields for each event.

As illustrated in FIG. 7, the example screen 400 further includes tabs under which respective groups of functions and informational fields are organized. Under the Details tab, activated in the view depicted in FIG. 7, the operator can access source documents both in the original and the enriched, or annotated, format. For example, the source document can be the original text of a relevant court decision, and the annotated format can display the semantic concepts which the event detection engine 102 or a similar component detected, various dates and numbers identified in the source document, etc. Further, the Details tab can include an interactive list of terms mentioned in the event and an interactive list of broader concepts detected in the event. The operator can selectively delete and add these terms and concepts.

The Related Events tab can include links to other events to allow the operator to review and modify the listing of events that were determined to be related. For example, the event detection engine 102 can determine that two recent events share multiple event attributes and automatically cross-reference these events for the operator. The Event Criteria tab can include an interactive listing of event criteria which the operator can review and adjust.

For example, to allow the operator to modify event criteria, the server system 12 of FIG. 1 can implement an example method 450. The method 450 begins at block 452, where a request to modify event criteria is received in response to the operator activating the Event Criteria, for example. At block 454, an interactive interface for modifying or building a query is presented. The interactive query interface can include controls for specifying event criteria and the relationships between the criteria. For example, the operator can specify that he or she wishes to search for clients shoe individual tax returns indicate one of: net primary production income/less is 2.1, share of net income from trusts is 10%, primary production losses claimed this income year is $50,000, etc. In one embodiment, these criteria are predefined and stored in the database, with the operator only supplying numerical parameters (2.1, 10%, $50,000, etc.). The relationships between the criteria the operator selects can include, for example, "should have at least one of," "must have all of," or "should have at least one of."

At block 456, the selections of attributes is received, and the query is executed in accordance with the selected attributes to obtain a set of matching clients at block 458. The obtained set can be used in alert distribution at block 460.

Example Service Provider Methods and User Interfaces

Figure 9:
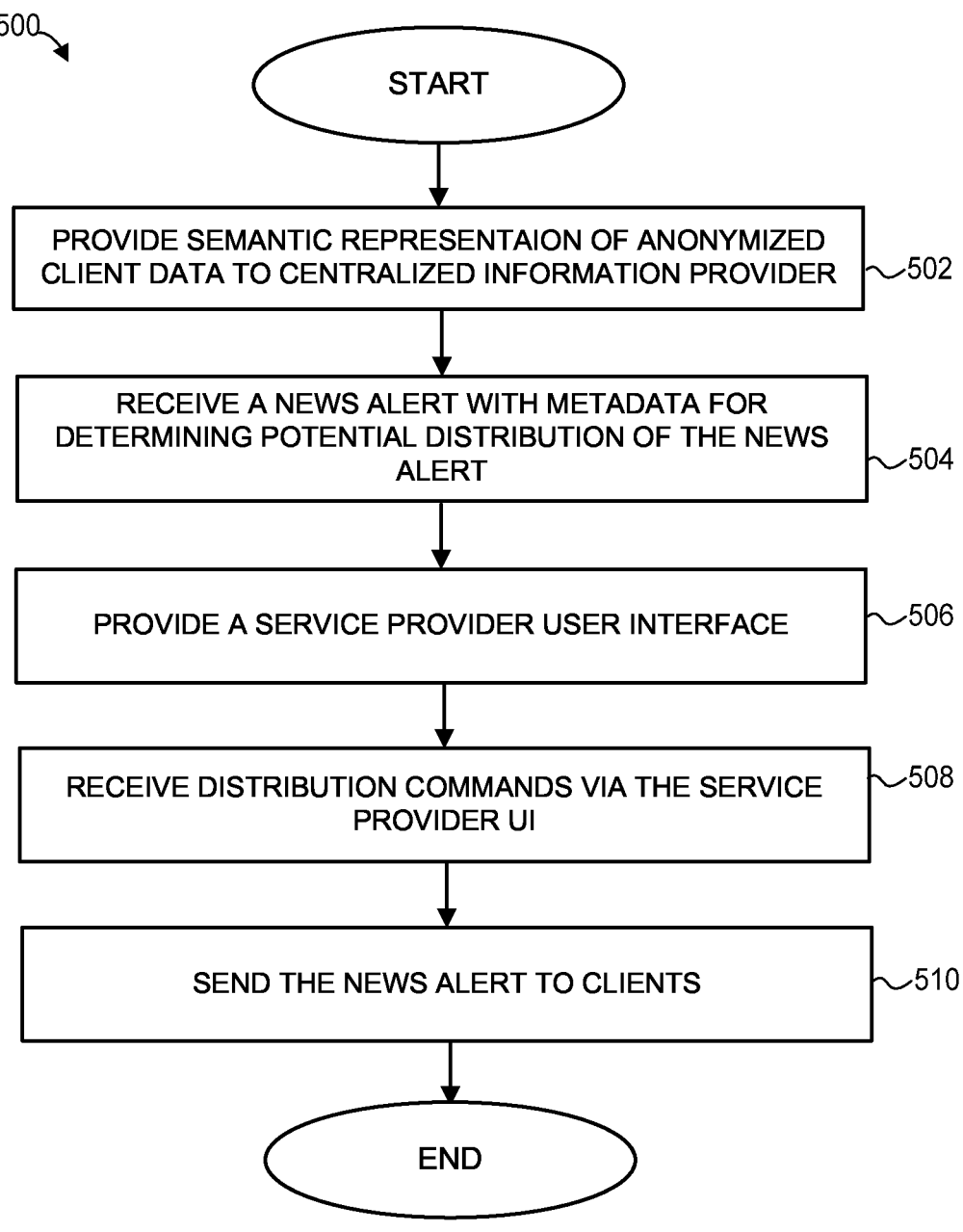
FIG. 9 is an example method for receiving alerts from a centralized information provider in response to anonymized data, which can be implemented in the service provider system illustrated the system of FIG. 1.

FIG. 9 depicts is a flow diagram of an example method 500 for receiving alerts from a centralized information provider in response to anonymized data, which can be implemented in one of the service provider systems 20 of FIG. 1, for example. Similar to the other methods of this disclosure, the method 500 can be implemented as a set of instructions stored on a computer-readable medium and executable by one or more processors.

The method 500 begins at block 502, where a semantic representation of an anonymized client data is provided to centralized information provider. The anonymized client data can include, for example, income tax statements in a standard, computer-parseable electronic format, with the data identifying clients replaced with temporary identifiers. At block 504, a news alert is received from the centralized information provider. The news alert can include a textual component (and, if desired, other media such as images) along with metadata for determining which clients of the service provider are likely to be interested in the news alert. The metadata can include temporary identifiers of clients, supplied as part of the anonymized client data. Additionally or alternatively, the metadata can include a client profile listing multiple attributes of a fictitious client potentially interested in the news alert.

At block 506, a service operator UI is provided as part of a web-based interface, for example. Next, distribution commands are received via the service operator UI at block 508, and the news alert is distributed in accordance with the received distribution commands at block 510.

For additional clarity, FIG. 10 illustrates an example widget 500 which the service operator UI can provide for reviewing received alerts. The widget 550 includes a listing of events received from the centralized information provider, an indication of how many clients of the service provider have been matched to the event based on their attributes, the date on which the events were announced, etc. The example widget 550 allows the service provider to rank the events based on the number of matched clients.

Thus, the service provider can determine how many clients are potentially impacted by the news alert using the received metadata, without analyzing the news event locally. Moreover, the metadata allows the service provider UI to automatically prioritize the alert messages based on the number of potentially impacted clients.

Next, FIG. 11 illustrates an example user interface screen 600 which the service provider UI can generate for reviewing event data. For each event, the screen 600 can include an event description, a client profile, a proposed client impact statement and a proposed client letter received from the centralized information provider, etc. The service provider can use the functions accessible via the screen 600 to modify the profiles of clients to which the news alert will be distributed, the text the clients will receive, etc.

Further, as illustrated in FIG. 12, the service provider can view the event criteria detected at the centralized information provider and, if desired, override these criteria. An example widget 650 can be provided as part of the service provider UI and can include a listing of individual event criteria and indications of how many clients have matching client criteria. In this example scenario, the widget 650 indicates that the event the service provider is reviewing in the screen 600 is applicable to companies with accessible income of $200,000 or less, companies who claimed a research and development offset, etc. In some implementations, the service provider can both override some or all of these event criteria and generate feedback for the centralized information provider. The centralized information provider in turn can generate an appropriate alert for an operator if a certain number or percentage of the service providers disagree with a certain event criterion.

Additional Considerations

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

For example, the network may include, but is not limited to, any combination of a LAN, a MAN, a WAN, a mobile, a wired or wireless network, a private network, or a virtual private network. Moreover, it is understood that any number of client computers or display devices are supported and may be in communication with the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

Accordingly, the term hardware should be understood to encompass a tangible entity, which may be one of an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules may provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and may operate on a resource (e.g., a collection of information).

The various operations of exemplary functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors). These operations are accessible via a network (e.g., the Internet) and via one or more appropriate interfaces (e.g., application program interfaces (APIs)).

The performance of certain operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for efficiently distributing alert messages through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method of facilitating distribution of electronic alerts to multiple clients via intermediate service providers, the method comprising:

providing, by one or more computer processors of no more than a single centralized information server, a graphical user interface (GUI) to the intermediate service providers, the GUI including input fields to receive informational input from each of the intermediate service providers, and the GUI also including a news event window configured to allow each of the intermediate service providers (1) to review electronic alert messages received from the single centralized information server and (2) to approve automatic distribution of the electronic alerts directly from the intermediate service providers to at least one of the clients;

receiving, by the one or more computer processors via the GUI of the intermediate service providers, client profiles linked to one or more client attributes of each of the clients of the intermediate service providers that may be interested in receiving the electronic alerts directly from the intermediate service providers, wherein the client profiles utilize anonymized client data from the intermediate service providers to identify the clients as potential candidates to receive the electronic alert messages;

receiving, by the one or more computer processors, textual information describing a news event from data sources external to both the server and the intermediate service providers;

receiving, by the one or more computer processors, semantic rules to process the textual information describing the news event using natural language processing (NLP);

applying, by only the one or more computer processors executing artificial intelligence on the server, the semantic rules to the textual information describing the news event, the applying including processing the textual information using the semantic rules and applying the NLP to the textual information;

identifying, based on the NLP and by only the one or more computer processors of the server without any semantic-related processing at any of the intermediate service providers, one or more semantic concepts about the news event contained within the textual information based on particular combinations or arrangements of the one or more semantic concepts within the textual information describing the news event;

determining, by the one or more computer processors and independent of the intermediate service providers, event attributes based on the one or more semantic concepts identified in the textual information;

retrieving, by the one or more computer processors of the server from an electronic database, (i) the anonymized client data including identifiers of the clients, (ii) a set of the one or more client attributes for each of the clients, (iii) for each of the clients, a provider identifier of a respective one of the intermediate service providers and (iv) the informational input received via the GUI;

determining, by the one or more computer processors, a respective metric of relevance of the news event for each of the clients based on a comparison of the client attributes of each of the clients and the event attributes for each of the clients, the respective metric of relevance indicating a level of interest of a respective client receiving information about the news event;

generating, by only the one or more computer processors and based on the respective metric of relevance exceeding a certain threshold number of the client attributes matching the event attributes of the news event, the electronic alert messages with metadata indicating a group of the clients associated with the client profiles that express interest in receiving the information about the news event, and each of the electronic alert messages including a textual message configured to be displayed, reviewed and manually modified within the news event window by the intermediate service providers before the GUI receives approval of the automatic distribution to the clients in the group; and transmitting the electronic alert messages, via bulk distribution from the centralized information server to each of the service providers by the one or more computer processors, and the transmitting being via a computer network based on the provider identifier for each of the clients in the group.

2. The method of claim 1, further comprising transmitting the client attributes to which textual information was determined to correspond, along with the electronic alert messages and identifiers of the clients.

3. The method of claim 1, further comprising:

providing, to at least one service provider of the intermediate service providers, a provider user interface including at least one of:

a first control for transmitting a bulk email based on the electronic alert messages to some or all of the clients, and a second control link for creating internal tasks related to the electronic alert messages for a set of clients and linking the set of clients to a respective electronic alert message for subsequent tracking.

4. The method of claim 1, further comprising:

providing, to an operator at a workstation, an operator user interface including a control for modifying semantic rules applied to the news event to identify the one or more semantic concepts associated with the news event.

5. The method of claim 4, wherein providing the operator user interface further includes providing a control for modifying or building a query made up of several criteria, to identify clients matching the several criteria.

6. The method of claim 1, further comprising applying semantic rules to identify the one or more semantic concepts associated with the news event by parsing the textual information to detect presence a certain arrangement of one or more semantic concepts.

7. The method of claim 1, further comprising
generating, using the client attributes to which the textual
information was determined to correspond, a profile of
a potential client for distribution of the news event, and
transmitting the profile of the potential client to at least
one service provider of the intermediate service pro-
viders.

8. The method of claim 1, wherein the semantic rules are
first semantic rules and the method further comprises:
applying the first semantic rules to identify one or more
semantic concepts associated with the news event and
automatically populating the electronic database the one
or more computer processors, with information related
to the clients using a set of documents, including
parsing the set of electronic documents using second
semantic rules.

9. A system for facilitating distribution of electronic alerts
to multiple clients via intermediate service providers, the
system comprising:
processing hardware of one or more computer processors
of no more than a single centralized information server;
and
a non-transitory computer-readable memory storing
thereon instructions that, when executed by the pro-
cessing hardware, cause the system to:
provide a graphical user interface (GUI) to the interme-
diate service providers, the GUI including input fields
to receive informational input from each of the inter-
mediate service providers, and the GUI also including
a news event window configured to allow each of the
intermediate service providers (1) to review electronic
alert messages received from the single centralized
information server and (2) to approve automatic distri-
bution of the electronic alerts directly from the inter-
mediate service providers to at least one of the clients;
receive, by the one or more computer processors via the
GUI of the intermediate service providers, client pro-
files linked to one or more client attributes of each of
the clients of the intermediate service providers that
may be interested in receiving the electronic alerts
directly from the intermediate service providers,
wherein the client profiles utilize anonymized client
data from the intermediate service providers to identify
the clients as potential candidates to receive the elec-
tronic alert messages;
receive, by the one or more computer processors, textual
information describing a news event from data sources
external to both the server and the intermediate service
providers;
receive, by the one or more computer processors, seman-
tic rules to process the textual information describing
the news event using natural language processing
(NLP);
apply, by only the one or more computer processors
executing artificial intelligence on the server, the
semantic rules to the textual information describing the
news event, the applying including processing the
textual information using the semantic rules and apply-
ing the NLP to the textual information;
identify, based on the NLP and by only the one or more
computer processors of the server without any seman-
tic-related processing at any of the intermediate service
providers, one or more semantic concepts about the
news event contained within the textual information
based on particular combinations or arrangements of
the one or more semantic concepts within the textual
information describing the news event;

determine, by the one or more computer processors and
independent of the intermediate service providers,
event attributes based on the one or more semantic
concepts identified in the textual information;
retrieve, by the one or more computer processors of the
server from an electronic database, (i) the anonymized
client data including identifiers of the clients, (ii) a set
of the one or more client attributes for each of the
clients, (iii) for each of the clients, a provider identifier
of a respective one of the intermediate service provid-
ers and (iv) the informational input received via the
GUI;
determine, by the one or more computer processors, a
respective metric of relevance of the news event for
each of the clients based on a comparison of the client
attributes of each of the clients and the event attributes
for each of the clients, the respective metric of rel-
evance indicating a level of interest of a respective
client receiving information about the news event;
generate, by only the one or more computer processors
and based on the respective metric of relevance exceed-
ing a certain threshold number of the client attributes
matching the event attributes of the news event, the
electronic alert messages with metadata indicating a
group of the clients associated with the client profiles
that express interest in receiving the information about
the news event, and each of the electronic alert mes-
sages including a textual message configured to be
displayed, reviewed and manually modified within the
news event window by the intermediate service pro-
viders before the GUI receives approval of the auto-
matic distribution to the clients in the group; and
transmit the electronic alert messages, via bulk distribu-
tion from the centralized information server to each of
the service providers by the one or more computer
processors, and the transmitting being via a computer
network based on the provider identifier for each of the
clients in the group.

10. The system of claim 9, wherein the instructions further
cause the system to transmit the client attributes to which
textual information was determined to correspond, along
with the electronic alert messages and identifiers of the
clients.

11. The system of claim 9, wherein the instructions further
cause the system to:
provide, to at least one service provider of the interme-
diate service providers, a provider user interface
including at least one of:
a first control for transmitting a bulk email based on the
electronic alert messages to some or all of the clients,
and
a second control link for creating internal tasks related to
the electronic alert messages for a set of clients and
linking the set of clients to the electronic alert message
for subsequent tracking.

12. The system of claim 9, wherein the instructions further
cause the system to provide, to an operator at a workstation,
an operator user interface including a control for modifying
semantic rules applied to the news event to identify the one
or more semantic concepts associated with the news event.

13. The system of claim 9, wherein the instructions further
cause the system to apply semantic rules to identify the one
or more semantic concepts associated with the news event
by parsing the textual information to detect presence a
certain arrangement of one or more semantic concepts.

14. The system of claim 9, wherein the instructions further
cause the system to:

generate, using the client attributes to which the textual information was determined to correspond, a profile of a potential client for distribution of the news event, and transmit the profile of the potential client to at least one service provider of the intermediate service providers.

15. The system of claim 9, further comprising: generating a respective metric of relevance of the news event based on weighing the client attributes to which the textual information was determined to correspond in accordance with specificity of each attribute.

16. A non-transitory computer-readable medium storing thereon instructions that, when executed by one or more computer processors of no more than a single centralized information server to distribute electronic alerts, cause the one or more computer processors to:

provide a graphical user interface (GUI) to intermediate service providers, the GUI including input fields to receive informational input from each of the intermediate service providers, and the GUI also including a news event window configured to allow each of the intermediate service providers (1) to review electronic alert messages received from the single centralized information server and (2) to approve automatic distribution of the electronic alerts directly from the inter-mediate service providers to at least one client of a plurality of clients;

receive, by the one or more computer processors via the GUI of the intermediate service providers, client pro-files linked to one or more client attributes of each of the clients of the intermediate service providers that may be interested in receiving the electronic alerts directly from the intermediate service providers, wherein the client profiles utilize anonymized client data from the intermediate service providers to identify the clients as potential candidates to receive the elec-tronic alert messages;

receive, by the one or more computer processors, textual information describing a news event from data sources external to both the server and the intermediate service providers;

receive, by the one or more computer processors, seman-tic rules to process the textual information describing the news event using natural language processing (NLP);

apply, by only the one or more computer processors executing artificial intelligence on the server, the semantic rules to the textual information describing the news event, the applying including processing the textual information using the semantic rules and apply-ing the NLP to the textual information;

identify, based on the NLP and by only the one or more computer processors of the server without any seman-tic-related processing at any of the intermediate service providers, one or more semantic concepts about the news event contained within the textual information based on particular combinations or arrangements of the one or more semantic concepts within the textual information describing the news event;

determine, by the one or more computer processors and independent of the intermediate service providers, event attributes based on the one or more semantic concepts identified in the textual information;

retrieve, by the one or more computer processors of the server from an electronic database, (i) the anonymized client data including identifiers of the clients, (ii) a set of the one or more client attributes for each of the clients, (iii) for each of the clients, a provider identifier of a respective one of the intermediate service provid-ers and (iv) the informational input received via the GUI;

determine, by the one or more computer processors, a respective metric of relevance of the news event for each of the clients based on a comparison of the client attributes of each of the clients and the event attributes for each of the clients, the respective metric of rel-evance indicating a level of interest of a respective client receiving information about the news event;

generate, by only the one or more computer processors and based on the respective metric of relevance exceed-ing a certain threshold number of the client attributes matching the event attributes of the news event, the electronic alert messages with metadata indicating a group of the clients associated with the client profiles that express interest in receiving the information about the news event, and each of the electronic alert mes-sages including a textual message configured to be displayed, reviewed and manually modified within the news event window by the intermediate service pro-viders before the GUI receives approval of the auto-matic distribution to the clients in the group; and transmit the electronic alert messages, via bulk distribu-tion from the centralized information server to each of the service providers by the one or more computer processors, and the transmitting being via a computer network based on the provider identifier for each of the clients in the group.

17. The non-transitory computer readable medium of claim 16, wherein the instructions further cause the one or more computer processors to transmit the client attributes to which textual information was determined to correspond, along with the electronic alert messages and identifiers of the clients.

18. The non-transitory computer readable medium of claim 16, wherein the instructions further cause the one or more computer processors to:

provide, to at least one service provider of the interme-diate service providers, a provider user interface including at least one of:

a first control for transmitting a bulk email based on the electronic alert messages to some or all of the clients, and a second control link for creating internal tasks related to the electronic alert messages for a set of clients and linking the set of clients to the electronic alert message for subsequent tracking.

19. The non-transitory computer readable medium of claim 16, wherein the instructions further cause the one or more computer processors to provide, to an operator at a workstation, an operator user interface including a control for modifying semantic rules applied to the news event to identify the one or more semantic concepts associated with the news event.

20. The non-transitory computer readable medium of claim 16, wherein the instructions further cause the one or more computer processors to apply semantic rules to iden-tify the one or more semantic concepts associated with the news event by parsing the textual information to detect presence a certain arrangement of one or more semantic concepts.

* * * * *